Dec. 22, 1970  W. BREITSCHWERDT  3,548,676
SAFETY STEERING WHEEL
Filed Aug. 25, 1967

INVENTOR
WERNER BREITSCHWERDT

BY *Craig & Antonelli*

ATTORNEYS

United States Patent Office 3,548,676
Patented Dec. 22, 1970

3,548,676
SAFETY STEERING WHEEL
Werner Breitschwerdt, Stuttgart-Botnang, Germany, assignor to Daimler-Benz Aktiengesellschaft, Stuttgart-Unterturkheim, Germany
Filed Aug. 25, 1967, Ser. No. 663,316
Claims priority, application Germany, Aug. 30, 1966,
D 50,975
Int. Cl. G05g 1/10
U.S. Cl. 74—552
19 Claims

ABSTRACT OF THE DISCLOSURE

A safety steering wheel for motor vehicles which comprises a steering wheel ring connected with the hub by way of two spokes which cross one another, preferably without mutual contact, and are secured to the hub in such a manner that the inner ends of the spokes are secured to respectively opposite sides of the hub.

BACKGROUND OF THE INVENTION

The present invention relates to a steering wheel for motor vehicles which is connected by way of two spokes with the hub of the steering column disposed lower than the steering wheel. The present invention aims at protecting the drivers as much as possible against injuries by the steering wheel in case of accidents.

With the known, prior art safety steering wheels the driver was supposed to be protected, above all, against a vehement impact against the steering wheel hub and against the injuries of the chest connected therewith. This was realized for the most part in the prior art in that the steering wheel hub was constructed padded or as deformation body.

SUMMARY OF THE INVENTION

However, the injuries of the driver are not only caused by the steering wheel hub but also by the steering wheel itself. Particularly endangered are the face, chin and neck portions of the driver. The aim of the present invention resides in obviating this drawback and inadequacy in that the steering wheel is constructed easily deformable in the direction of the steering column whereby the transmission of the torque is nonetheless assured completely satisfactorily and unobjectionably.

The underlying problems are solved in accordance with the present invention in that the spokes of the steering wheel cross each other, without touching one another, between the steering wheel ring and the hub and in that the right spoke is secured on the left hub side, and the left spoke on the right hub side. Large deformation paths are achieved thereby.

It is particularly advantageous to construct the spokes relatively long and to design the same preferably convex as viewed from the driver. The deformability of the spokes is thereby increased still further in the direction of the steering column without impairing the rigidity for the transmission of torque.

The spokes, subtending an obtuse angle as viewed from the driver, may be so cranked or offset to one another that they can be secured at opposite points of the hub.

If the spokes are not to be connected at exactly oppositely disposed points of the hub, then it suffices to provide at least one of the spokes subtending an obtuse angle with a radial curvature within the area of the hub so that this spoke extends past the other spoke without touching the same.

A very favorable construction results if one of the spokes which are disposed accurately opposite one another at the steering wheel, is constructed in a fork-shaped manner and surrounds the other spoke for securing purposes at the hub.

In the standard case, the spokes are rigidly secured at the hub. However, it is also possible to secure the spokes at the hub pivotally in the axial direction whereby their yieldingness is still further enhanced in the axial direction.

Preferably, the spokes are constructed of flat material and are so arranged that the largest torque resistance lies in the direction of the rotating movement.

An additional protection against injuries by the hub is achieved if the central space between steering wheel and hub is provided with a body of conventional foamed material or with a deformation pot.

In order to limit the axial movability within the area of the hub, a support member may be arranged between the hub and the spokes against which abut the spokes in case of deformations.

Accordingly, it is an object of the present invention to provide a safety steering wheel which obviates the aforementioned shortcomings and drawbacks encountered with the prior art constructions.

It is another object of the present invention to provide a safety steering wheel for motor vehicles which further enhances the safety for the driver of the vehicle against injuries in case of accidents.

Still a further object of the present invention resides in a safety steering wheel which protects the driver of the vehicle against injury stemming from the steering wheel itself.

Still another object of the present invention resides in a safety steering wheel constructed deformable in the direction of the steering column yet completely satisfactory as regards transmission of torque.

Another object of the present invention resides in a safety steering wheel, capable of deforming after impact, which excels by a particularly long deformation path.

These and other objects, features, and advantages of the present invention will become more obvious from the following description when taken in connection with the accompanying drawing which shows, for purposes of illustration only, several embodiments in accordance with the present invention, and wherein.

Figure 1:
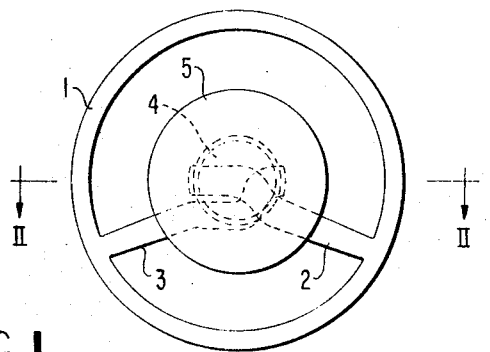
FIG. 1 is a plan view on one embodiment of a novel safety steering wheel according to the present invention provided with curved spokes and a body of foamed material.

Referring now to the drawing wherein like reference numerals are used throughout the various views to designate like parts, and more particularly to FIG. 1, reference numeral 1 designates therein a steering wheel ring on which the two spokes 2 and 3 are arranged at an obtuse angle to one another. Both spokes 2 and 3 are so curved and/or offset within the area of the hub 4 that they pass one another without mutual contact, and are secured at oppositely disposed points of the hub 4. The body 5 of any conventional foamed material surrounds the hub 4 and a portion of the spokes 2 and 3 lies in the axial direction. The convex spokes 2 and 3 are welded to the hub 4, and the hub 4 in connected with the steering column 6 by way of a cone 7 and a nut 8.

Figure 3:
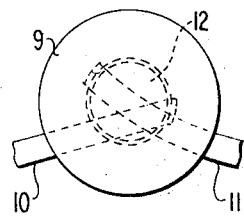
FIG. 3 is a partial plan view on a modified embodiment of a safety steering wheel according to the present invention provided with a radially curved spoke at the hub.
Figure 2:
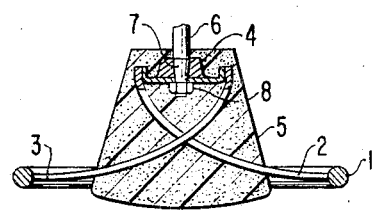
FIG. 2 is a cross-sectional view taken along line II—II of FIG. 1.

In the embodiment of FIG. 3, one spoke 10 extends rectilinearly within the foamed material body 9 and the other spoke 11 is radially curved therein. The two spokes 9 and 10 are secured at points of the hub 12, which are not disposed opposite one another, in the same manner as illustrated in FIG. 2.

Figure 4:
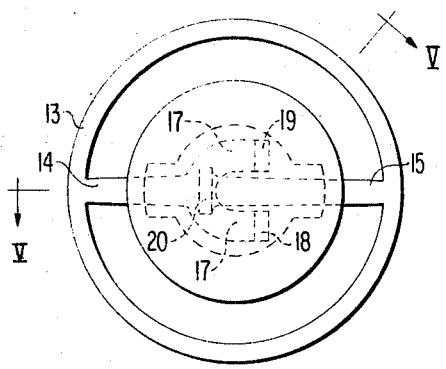
FIG. 4 is a plan view on still a further modified embodiment of a safety steering wheel according to the present invention provided with a fork-shaped spoke pivotally secured in the axial direction and with a deformation pot.
Figure 5:
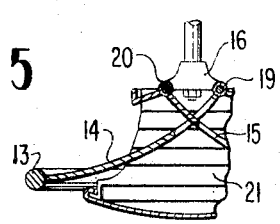
FIG. 5 is a cross-sectional view taken along line V—V of FIG. 4.
Figure 5A:
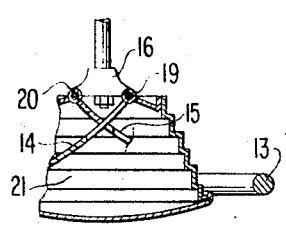
FIG. 5a is a cross-sectional view, similar to FIG. 5, and illustrating a modified construction of the deformation pot.

The spokes 14 and 15 are arranged at the steering wheel ring 13 of FIG. 4 at two oppositely disposed points. The spoke 14 is extended in a fork-shaped manner within the area of the hub 16. The two legs 17 of this extension surround the spoke 15 and are secured at the hub 16 pivotally in the axial direction within pivotal bearing supports 18 and 19 of any conventional construction. The spoke 15 is also secured pivotally in the axial direction in pivotal bearing support 20. The deformation pot 21 may be constructed externally smooth (FIG. 5) or in the form of a folding bellows as illustrated in FIG. 5a.

Figure 6:
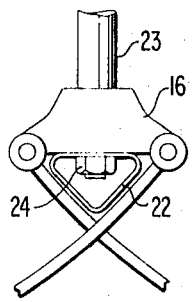
FIG. 6 is a partial cross-sectional view illustrating a hub-securing arrangement at the steering column for the embodiment according to FIGS. 4 and 5 in which a support member is installed for limiting the axial movement.

FIG. 6 illustrates how a support member 22 of triangular shape in cross section may be installed within the area of the nut 24 connecting the hub 16 with the steering column 23 in order to limit the axial movability of the steering wheel within the area of the hub 16.

While I have shown and described several embodiments in accordance with the present invention, it is understood that the same is not limited thereto but is susceptible of numerous changes and modifications as known to a person skilled in the art, and I therefore do not wish to be limited to the details shown and described herein but intend to cover all such changes and modifications.

I claim:

1. A safety steering wheel arrangement for motor vehicles having a steering column, a hub portion operatively connected therewith and a steering wheel ring disposed in a plane relatively higher than that of said hub portion, wherein the improvement comprises means for facilitating substantial relative displacement between said steering wheel ring and said hub portion in the axial direction of said steering column, said means including two spokes interconnecting said hub portion and said steering wheel ring, said two spokes respectively being rigidly secured, at one end thereof, to said steering wheel ring at places thereon widely spaced apart and extending over relatively long paths which cross between said steering wheel ring and said hub portion and being connected, at the opposite end thereof, to said hub portion such that, when viewed from the position of a driver, the spokes each have a convex configuration, together subtend an obtuse angle and are offset from one another such that the connections thereof at the hub portion are disposed substantially opposite one another, the left spoke being connected at the right side of said hub portion and vice versa, whereby said spokes effectively transmit substantial torque, but are relatively deformable under loading in a plane normal to said plane containing said steering wheel ring, wherein the spokes cross one another essentially without contact.

2. A safety steering wheel according to claim 1, wherein at least one of the two spokes subtending an obtuse angle is curved radially within the area of the hub as viewed from the driver and the two spokes are secured at two points of the hub other than accurately opposite one another.

3. A safety steering wheel according to claim 1, wherein said two spokes are disposed at substantially mutually opposite points of the steering wheel, one of said spokes being constructed in a fork-shaped manner and surrounding the other spoke for the securing at the hub.

4. A safety steering wheel according to claim 3, wherein said spokes are secured at said hub portion for pivotal motion in a plane normal to a plane containing said steering wheel ring.

5. A safety steering wheel according to claim 2, wherein the spokes are made from flat material.

6. A safety steering wheel according to claim 5, whereis a body of foamed material is arranged in the central space between the steering wheel and the hub.

7. A safety steering wheel according to claim 5, wherein a deformation pot is arranged in the central space between the steering wheel and the hub.

8. A safety steering wheel according to claim 7, further comprising support means for limiting the axial movability which is provided within the area of the hub between the hub and the spokes.

9. A safety steering wheel according to claim 1, wherein the spokes are rigidly secured at the hub.

10. A safety steering wheel according to claim 1, wherein said spokes are secured at said hub portion for pivotal motion in a plane normal to a plane containing said steering wheel ring.

11. A safety steering wheel according to claim 1, wherein a body of foamed material is arranged in the central space between the steering wheel and the hub.

12. A safety steering wheel according to claim 1, wherein a deformation pot is arranged in the central space between the steering wheel and the hub.

13. A safety steering wheel according to claim 12, further comprising support means for limiting the axial movability which is provided within the area of the hub between the hub and the spokes.

14. A safety steering wheel according to claim 13, wherein the spokes are rigidly secured at the hub.

15. A safety steering wheel according to claim 13, wherein said spokes are secured at the hub pivotally in the axial direction.

16. A safety steering wheel according to claim 15, wherein a deformation pot is arranged in the central space between the steering wheel and the hub.

17. A safety steering wheel according to claim 15, further comprising support means for limiting the axial movability which is provided within the area of the hub between the hub and the spokes.

18. A safety steering wheel according to claim 15, wherein a body of foamed material is arranged in the central space between the steering wheel and the hub.

19. A safety steering wheel according to claim 18, further comprising support means for limiting the axial movability which is provided within the area of the hub between the hub and the spokes.

References Cited

UNITED STATES PATENTS

| 2,909,941 | 10/1959 | Guest | 74—552 |
| 3,016,764 | 1/1962 | Fredericks et al. | 74—552 |
| 3,285,091 | 11/1966 | Fiala | 74—552 |
| 3,364,785 | 1/1968 | Geller | 74—552 |

FOREIGN PATENTS

| 66,774 | 3/1957 | France | 74—552 |
| 602,392 | 12/1925 | France | 74—552 |
| 711,913 | 8/1931 | France | 74—552 |
| 848,458 | 9/1952 | Germany | 74—552 |

MANUEL A. ANTONAKAS, Primary Examiner